No. 657,623. Patented Sept. 11, 1900.
J. J. SHIRKEY.
ICE REMOVING TROLLEY FOR ELECTRIC RAILWAYS.
(Application filed Apr. 30, 1900.)
(No Model.)
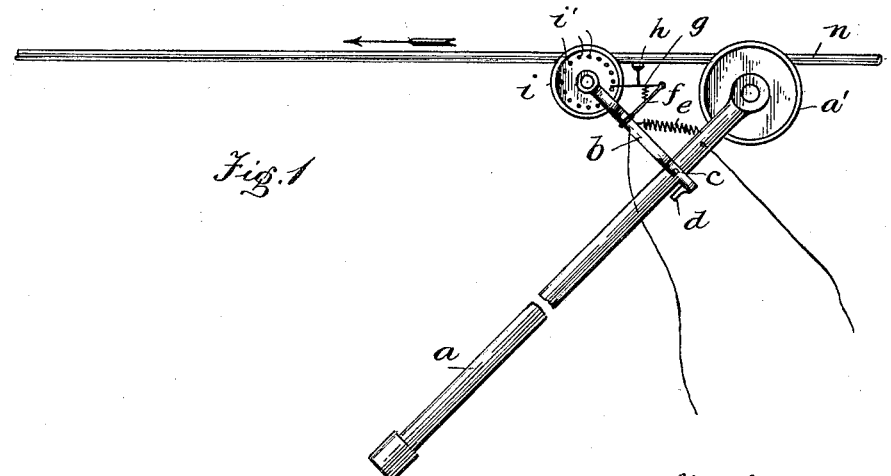
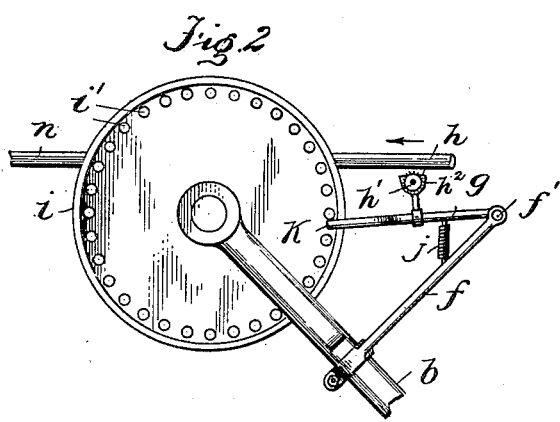
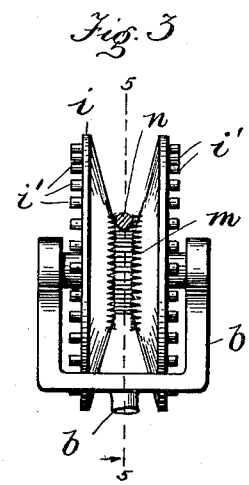
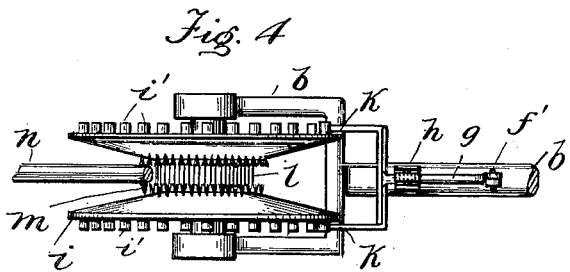
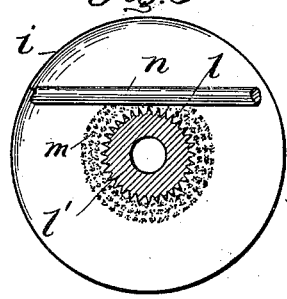
Witnesses:
Inventor
John J. Shirkey
by Wm. Zimmerman
Att'y.

UNITED STATES PATENT OFFICE.

JOHN J. SHIRKEY, OF CHICAGO, ILLINOIS.

ICE-REMOVING TROLLEY FOR ELECTRIC RAILWAYS.

SPECIFICATION forming part of Letters Patent No. 657,623, dated September 11, 1900.

Application filed April 30, 1900. Serial No. 14,843. (No model.)

*To all whom it may concern:*

Be it known that I, JOHN J. SHIRKEY, a citizen of the United States, residing at Chicago, in the county of Cook and State of Illinois, have invented certain new and useful Improvements in Mechanism for Removing Ice from Trolley-Wires, which are fully set forth in the following specification, reference being had to the accompanying drawings, forming a part hereof, and in which—

Figure 1 shows a trolley-arm in side elevation provided with my said improved device. Fig. 2 shows my said device attached to the trolley-arm on an enlarged scale, also in side elevation. Fig. 3 shows a rear elevation of Fig. 2. Fig. 4 shows a plan view of Fig. 2. Fig. 5 shows a sectional side elevation on the line 5 5 of Fig. 3.

Like letters of reference indicate like parts.

The object of my invention is to produce a mechanism to be attached to the ordinary trolley-arm, wherewith the ice and sleet frozen to the trolley-wire and hindering the effective working of the mechanism may be removed. To attain said desirable end, I construct my said new device in substantially the following manner, namely:

To the ordinary trolley-arm $a$ and its wheel $a'$ I attach an arm $b$, pivoted at $c$, and provided with a stop $d$ to check the action of the coiled tension-spring $e$, which connects said arms $a$ and $b$. Said arm $b$ is forked at its outer end and carries between its fork-arms a trolley or roller $i$, consisting of two side disks, which are provided on their outer sides with tappets $i'$. Said disks are connected by a spool $l'$, provided circumferentially with a series of radial and axially-parallel knives $l$, and each of said side disks is provided on its interior surface with steel teeth $m$, passing closely on each side of and above the trolley-wire $n$. The said knives $l$ cut the ice transversely to the wire into small blocks, which the brushing-teeth $m$ will then more easily remove. To further increase the effectiveness of my said mechanism, a fixed arm $f$ on the arm $b$ carries an arm $g$ parallel to the wire $n$. A hinge-joint at $f'$ connects said parts $f$ and $g$, and a pushing or extension spring $j$ raises the free end of the bar $g$. The outer end of said bar $g$ is forked into arms $k$, which reach the tappets $i'$, and on said arm $g$ is mounted a ram $h$, which strikes against the trolley-wire $n$ as the tappets $i$ successively engage and release said fork-arms, whereby the ice will be broken and beaten down from the trolley-wire and the electric current allowed to act. In the ram $h$ is a roller $h'$, with radial and axially-parallel blades $h^2$ to cut the ice and to roll on the wire when in contact with it.

What I claim is—

1. The combination with a trolley-wheel and its arm, of a spring-actuated reciprocable arm on said trolley-arm, a flanged spool on said reciprocable arm, axially-parallel cutters on the body of said spool and cylindrical teeth projecting from the opposite inner faces of said flanges, said teeth having points passing closely by the trolley-wire, substantially as specified.

2. The combination with a trolley-arm, of a reciprocable spring-actuated arm provided with a fixed arm carrying a reciprocable arm, a ram to said latter reciprocable arm and mechanism to vibrate said arm, substantially as specified.

3. The combination with a trolley-arm, of a vibratable arm to said trolley-arm, a rotatable cylindrical ram to said arm, means to support said arm and mechanism to vibrate said ram, substantially as specified.

4. The combination with a trolley-arm, of a vibratable arm, a bladed rotatable ram to said arm means to support said arm and mechanism to vibrate said ram, substantially as specified.

JOHN J. SHIRKEY.

Witnesses:
I. H. PEDRICK,
BERTRAM E. SHERMAN.